July 3, 1928.
I. DVORINE
OPTOMETRICAL INSTRUMENT
Filed Aug. 16, 1927
1,675,407
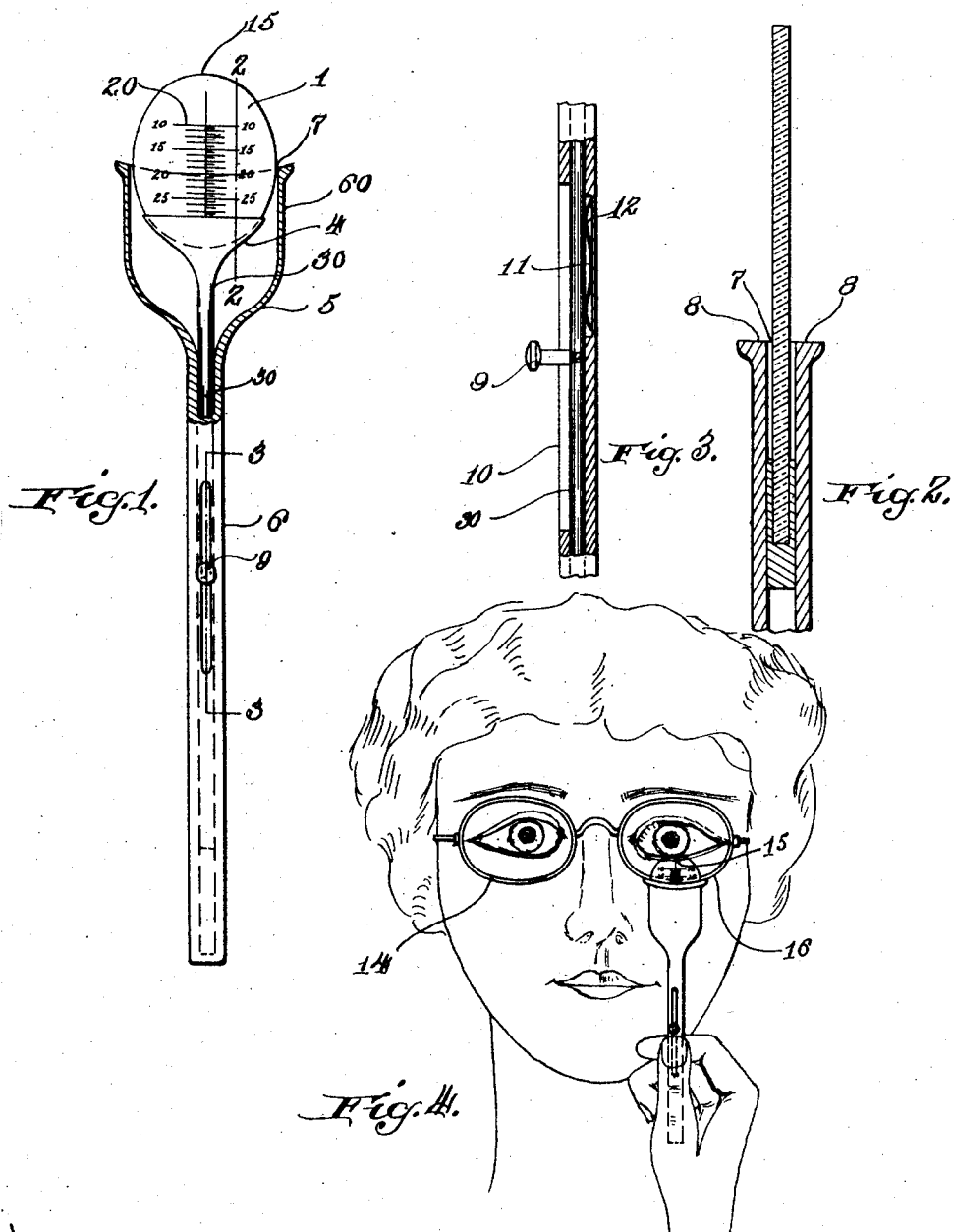

Patented July 3, 1928.

1,675,407

UNITED STATES PATENT OFFICE.

ISRAEL DVORINE, OF BALTIMORE, MARYLAND.

OPTOMETRICAL INSTRUMENT.

Application filed August 16, 1927. Serial No. 213,253.

In obtaining data for the preparation of eye glasses or spectacles having the bifocal lens, considerable difficulty has been encountered in determining the proper location of the intersection or line of contact of the two lens segments. This measurement cannot be treated as constant, not only on account of the variation between the corresponding optical dimensions of the different patients, but also on account of the variation in fit of the frames and consequently of the position of the lenses relative to the eye, the size of the rims and other variations which can hardly be catalogued.

The present invention relates to the provision of an instrument whereby this data can be obtained immediately in connection with each patient.

In the accompanying drawings I have illustrated an instrument embodying the features of my invention in the preferred form.

In the drawings:

Figure 1 is an elevation of the instrument in upright position.

Figure 2 is a section at right angles to Figure 1, of the upper end of the instrument, the same being taken on the line 2—2 of Figure 1.

Figure 3 is a sectional view taken in the plane of the axis at right angles to Figure 1, the same being taken on the line 3—3 of Figure 1.

Figure 4 is a general view illstrating the manner of using the instrument in the operation of obtaining data for the construction of bifocal lens spectacles or glasses.

Referring to the drawing by numerals, each of which is used to indicate the same or similar parts in the different figures, the instrument, as shown, consists of a gauge plate 1 which is preferably of glass or any suitable transparent material and of curved outline, being shown as oval. This gauge plate, as shown, is marked with a suitable scale 20 and provided with a downwardly projecting supporting shaft 30 to which, in the form of the invention shown, it is secured by means of a socket or seating member 4 formed on the upper end of the shaft, the plate 1 being inserted at its lower end in the socket and cemented or otherwise suitably secured.

The gauge plate 1 and shaft 30 are mounted in a suitable casing or support 5 having a tubular handle portion 6 to enclose the shaft 30 and an enlarged flattened gauge or gauge plate enclosing portion 60 at the upper end supported thereon. This plate enclosing portion of the case is shown as having a slot-like opening 7 at its upper edge 8, which is curved to conform to the curve at the lower edge of the eye glass frame or lens. These upper edges 8 are shown as widened to provide a suitable measuring abutment to engage the lower side of the rim or lens of the glasses or spectacles.

In the form of the invention shown, the supporting shaft 30 is provided with a projecting button or pin 9, most conveniently engaged by the thumb of the operator or optometrist to move the measuring plate or gauge plate up and down, as hereinafter described. To provide a path for the pin 9 as the shaft and plate are moved up and down the tube 6 is slotted in the direction of its axis at 10 on one side and is preferably further slotted at 11 for a short distance, the slot extending into the material from the inside of the tube 6 and being of less depth than the thickness of the material, providing a seat for the spring 12 which bears against the shaft 30, creating sufficient friction to hold the parts in adjusted or measuring position.

In the operation of the invention, i. e., in the use of the instrument to obtain the desired data, the patient is first fitted with a suitable eye glass or spectacle frame 14, as shown in Figure 4. The optometrist, standing in front of the patient, then places the abutment 8 in contact with the lower side of the spectacle rim 16, the operation being performed on each rim successively, and holding the handle 6 below the rim in a position which is substantially vertical, the thumb being engaged with the pin or button 9, as shown in the view Figure 4, he moves the measuring plate 1 to a position in which the upper edge of the same at 15 is in the position which, in his judgment should be occupied by the line of intersection of the two segments of the bifocal lens. This measurement between the upper edge of the gauge plate 15 and the edge or abutment 8 is indicated by the scale 2 and is then suitably recorded and used in the preparation of the spectacles or eye glasses.

In case it is desired to obtain this data in connection with the preparation of a one piece bifocal lens glasses without rims, a frame with any suitable lenses, plain or otherwise, of the dimension which it is desired to give the lens in the finished product may be fitted and the measurement obtained as already described in connection with the glasses having rims. The original lenses, being the exact shape of the finished bifocals, are then removed and the finished bifocals substituted.

It will be noted that while the graduations 20 on the measuring plate 1 begin at "10", the graduation mark "10" is spaced downwardly from the upper edge 15 of the measuring plate a distance of ten units. The exact manner of graduation of the plate is, however, immaterial.

I have thus described specifically and in detail an instrument embodying my invention in the preferred form in order that the nature and operation of the same may be clearly understood, however, the specific terms herein are used descriptively rather than in a limiting sense, the scope of the invention being defined in the claims.

What I claim as new and desire to secure by Letters Patent is:

1. The combination in an instrument for determining by measurement taken from the patient the position of the line of intersection of the segments of a bifocal lens or spectacles which consists of a transparent oval measuring plate, a casing for the same slotted to admit the measuring plate and having a measuring abutment adapted to contact the edge of a spectacle rim, the casing having a hollow handle having a longitudinal slot therein and a shaft within the handle supporting the plate with means on the shaft protruding through the slot whereby the plate may be moved up and down relatively to the rim and in front of the eye to determine the proper relation of the line of intersection of the segments of the bifocal lens to the rim.

2. The combination in an instrument for determining by measurement taken from the patient the position of the line of intersection of the segments of a bifocal lens or spectacle which consists of a support, a measuring abutment, a measuring plate mounted to slide transversely to the abutment and means for engagement by the hand whereby the plate may be moved up and down in front of the eye as the abutment is held in contact with the rim of an eye glass worn by the patient.

3. The combination in an instrument for determining by measurement taken from the patient the position of the line of intersection of the segments of a bifocal lens or spectacle which consists of a support having a handle, a measuring abutment, a measuring plate mounted to slide transversely to the abutment and means for engagement by the hand whereby the plate may be moved up and down in front of the eye as the abutment is held in contact with the rim of an eye glass worn by the patient.

4. The combination in an instrument for obtaining by measurement taken from the patient the proper position for the line of the intersection of the segments of a bifocal lens which consists of a support having an abutment, a measuring plate mounted to slide on the support transversely to the abutment, a handle for the support and means connected to the measuring plate to be engaged by the thumb of the hand grasping the handle to move the measuring plate relatively to the abutment.

Signed by me at Baltimore, Maryland, this 15th day of August, 1927.

ISRAEL DVORINE.